INVENTOR.
ROBERT BOWLING BARNES

INVENTOR.
ROBERT BOWLING BARNES

ATTORNEY

United States Patent Office 3,287,559
Patented Nov. 22, 1966

3,287,559
INFRARED THERMOGRAM CAMERA AND SCANNING MEANS THEREFOR
Robert Bowling Barnes, Stamford, Conn., assignor to Barnes Engineering Company, Stamford, Conn., a corporation of Delaware
Filed Oct. 4, 1963, Ser. No. 313,863
10 Claims. (Cl. 250—65)

This invention relates to an improved infrared thermograph and more particularly to a thermograph in which there is an improved scanning mechanism, both for the infrared detector and for producing a visible record.

Infrared thermographs which produce thermograms or heat pictures have achieved success in various fields, including medical diagnosis. The most commonly used thermograph is of the type described and claimed in the U.S. patent to Astheimer and Wormser No. 2,895,049, July 14, 1959. In this thermograph an infrared detector is scanned across the object to be thermographed, the detector remaining fixed and the scanning being effected by a mirror which scans across the object horizontally, and at the same time, or preferably after each horizontal line, is moved about an axis at right angles so that the next line is vertically displaced. The resulting scan is in the form of a raster similar to that produced by television cameras, but with fewer lines, normally about 160 lines instead of over 500 per frame.

The output of the infrared detector, which is A.C. as the conventional chopper is used to interrupt the scanning beam, is amplified and the output varies the intensity of a glow tube in proportion to the amount of infrared radiation striking the detector from any particular portion of the scene scanned. The glow tube can either be mounted on the scanning mirror, or another part of the scanning mirror may reflect visible light from the glow tube. In each case, the beam from the glow tube is moved across a photographic surface contained in a conventional camera back. As a result, there is produced a perfectly registered thermogram in which visual light intensity corresponds to infrared radiation received by the detector.

The oscillation of the scanning mirror and its motion about another axis for vertical spacing of scanned lines has resulted in certain limitations on the thermograph use. One of the limitations is that the large and heavy mirror can only be oscillated at quite moderate rates without excessive driving power or vibration. This has resulted in limiting the speed with which a thermogram can be taken to something of the order of magnitude of about five minutes. In other words, the mirror is oscillated only about once every two seconds.

A less serious limitation in the thermograph which has been hitherto used is that the rays from the glow tube pass through a camera objective fastened to a small mirror on the back of the large scanning mirror, and they are then reflected back to the objective, being focused on the film or other recording medium in the camera back. This requires that the camera bellows, which extends to the objective, has to move in two directions. With the relatively very moderate scanning speed of the large scanning mirror, this presents no serious problem in maintenance, but it is always undesirable to move unnecessary parts of an optical system, and therefore in this respect, also, the thermographs which have been used hitherto fall somewhat short of the ideal.

According to the present invention, scanning is effected by one or two rotating drums or prisms with external mirror segments. The two-prism modification will be described first. One prism turns at much higher speed than the other, and provides for horizontal scanning, whereas the other, turning slowly about an axis at right angles to the first axis provides for vertical scanning. Finally, the rays from the object to be scanned pass through a conventional chopper and strike an infrared detector which may if desired, be of the conventional in-line type mounted at the bottom of a conical reference body. In such a case, the chopper blades have mirror backs alternately reflecting the radiation from the black body cavity onto the detector, and passing radiation from the scene being scanned. An ambient temperature reference source is also known and can be constituted by blackened chopper blades. This is simpler and cheaper than the modification in which the reference body is maintained at a definite temperature. It is less versatile, but can be used effectively in certain thermographs, for example for medical use, where the range of temperatures represented by the thermogram is narrow and the ambient conditions are quite stable. The present invention is useful with any type of reference source, and this flexibility is a practical advantage. The scanning prisms or drums rotate and do not oscillate. They are light, and present no severely limiting problem of scanning speed or vibration. They therefore permit higher scanning speeds, limited only by the detector sensitivity and time constant. The problem of scanning the radiation from a glow tube, the intensity of which is controlled by the infrared detector, as in the past, is also solved by having the rays reflected from another face, usually a face of the more slowly turning vertical scanning prisms, and then from another face of the rapidly turning horizontal prism onto the photographic film. As will be seen after a description of the drawings, this is conveniently done by having the slow vertical scanning prism somewhat elongated, or two such prisms may be mounted on a single driving axis.

The use of the scanning reflectors, or rather reflecting prisms, to scan the glow tube across the photographic surface presents a number of advantages. In the first place, the same elements perform both functions of infrared scanning and visual scanning, with only the necessity for increasing somewhat the size of one of the scanning prisms. This is a very economical design, and permits a compact instrument at minimum construction costs. An even more important advantage is that the prisms or drums with mirror segments are rigid, quite rugged devices, and they remain in accurate alignment so that the visual trace from the glow tube is a precise counterpart of the infrared scan. There is no necessity for additional synchronized moving parts in the visual camera portion of the thermograph. On the contrary, the objective lenses are stationary and remain in alignment. This permits accurate focusing without any possibility of change in use. Also, it permits the simplest possible camera construction. These are desirable attributes of the invention, but are, of course, not as important as the absolute synchronism of visual and infrared scan.

The use of two prisms as scanners has an advantage that since one prism turning slowly directs a beam on the center line of the horizontal scanning prism there will be no keystoning effect because all of the lines will be straight and parallel. This advantage is of importance where the maximum of resolution at the sides of a thermogram is important. The advantages are obtained, of course, by the use of two prisms and hence require a larger number of optical elements. However, where keystoning cannot be tolerated this additional complication is often worthwhile.

The particular construction of the two scanners is not vital. They may be in the form of glass prisms with aluminized reflecting surfaces, or they may be drums with external reflecting segments. The choice is largely dictated by economics. The prisms are more rigid, but the drums are somewhat lighter. Since either type is equally useful, the most economical design for a particular instrument may be chosen.

An even more compact design is possible when there is only one rotating prism, with an even number of faces, which effects horizontal scanning, both of the infrared detector across the scene and of the beam from the visible light source across the photographic surface. The scanning prism is mounted in a gimbal arrangement which can be moved or turned about an axis at right angles to the axis of rotation of the prism. This causes the prism to be tipped through a small angle vertically, somewhat in the same manner as the horizontal scanning mirror in the Astheimer and Wormser thermograph is tilted or nutated. This results in the successive lines being displaced vertically. The nutation of the scanning prisms by turning the gimbal framework about the second axis may be effected continuously, but of course at very much slower speed, or preferably by a stepping motor at the end of each horizontal line. The latter method has some advantages, as it preserves the relative horizontality of the respective lines, whereas, if there is continuous vertical movement, the lines of the thermogram are somewhat tilted.

When a single prisms is used, the utmost compactness is obtained, and of course the utmost in perfection of alignment, because a single prism cannot have its mirror surfaces distorted readily. However, when a single prism is used, it must have an even number of sides. The simplest and most rugged form of prisms is a cube, but prisms of other even numbers of faces may be used. It is even possible to have two mirror faces which might be thought of as a two-dimensional prisms; however, this is not quite as rigid as a cube, and prisms with larger numbers of faces, such as hexagons, have advantages. When a cube is used, the scanning angle horizontally is relatively large, and when the ordinary size of scanning angle, about 20° horizontally, is used there will be a considerable amount of dead time between scans. In other words, the detector will have to have a shorter time constant and a greater sensitivity for a given time for scanning the whole scene. As a result, when very short scanning times are required there is an advantage in using prisms having more sides, for example, hexagons, octagons and prisms with even larger numbers of faces. The greater the number of faces on the prism the more expensive it is to construct to a given degree of accuracy. The choice of how many faces the prism should have is, therefore, a compromise of these two factors. For many practical thermographs octagons may be as far as it is worthwhile to go in increasing the number of faces and hence decreasing the dead time during a scan. The invention, however, is not limited to the use of prisms of any particular even number of faces.

It has been pointed out above that in the two-prism scanner elements keystoning does occur when a single prism is used which not only rotates but nutates. In many cases the keystoning effect may not be sufficiently serious to affect adversely the thermograms produced, and in such cases the greater simplicity and perfect alignment of the single-prism modification may render it preferable. It is an advantage of the invention, however, that there is a choice between two-prism and single-prism scanning so that the best overall compromise may be chosen in any particular case.

The invention will be described in greater detail in conjunction with the drawings, which are pictorial isometric representations in semi-diagrammatic form:

Figure 1:
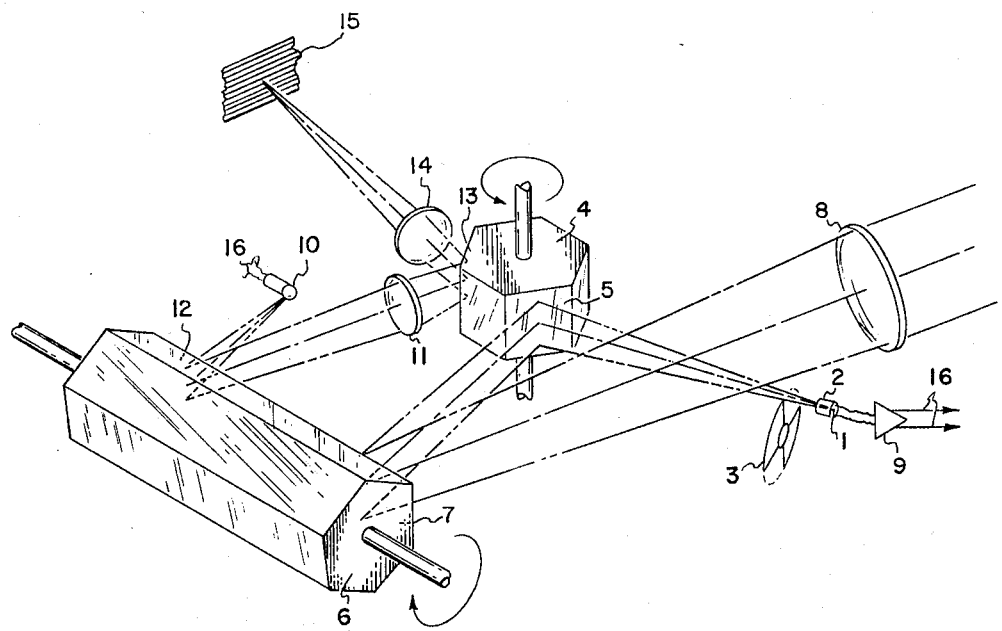
FIG. 1 is a two-prism modification.

In FIG. 1 an infrared detector 1 is shown at the bottom of a reference black body cavity 2. There is provided a chopper 3 of conventional design with mirror plated backs, driven at a synchronous chopping speed by a conventional motor (not shown). As in many optical instruments, the operation of the instrument and the arrangement of its parts can be more accurately visualized by considering the detector as a source of radiation. The optical path is, of course, symmetrical.

Using this method of explaining the system, the rays from the detector strike a mirror surface 5 on a rapidly rotating drum 4, which is in the form of a hexagonal prism. Rotation is effected by a conventional synchronous motor (not shown), and the direction of rotation is indicated by the arrow. The rays are reflected from the face 5 and strike the face 7 of an elongated hexagonal prism 6 which turns more slowly in the direction shown by the arrow. The axis of the prism 6 is, of course, at right angles to that of the axis of rotation of the prism 4 but, as will be seen, is slightly displaced sideways therefrom, thus permitting the entire optical system to be in a single plane. The rays reflected from the mirror segment 7 then pass through a collecting optical system, shown diagrammatically as an objective 8, which is, of course, movable to effect focusing for objects to be scanned at different distances. In actual operation, of course, the particular spot of the object to be scanned radiates in the infrared and strikes the detector, thus exactly reversing the travel in the optical path described above.

As scanning proceeds, successive portions of the object are imaged on the detector in the form of a raster with horizontal lines vertically displaced. In a typical operation there will be 160 lines which means that the prism 4 rotates 160 times as fast as the prism 6. The two prism drives are connected together by conventional gearing (not shown), so that the prisms turn absolutely in synchronism at all times.

Since the infrared radiation from the object to be scanned is utilized, the optics must be suitable for the infrared, and if an objective is used, it must transmit in the infrared, and may, for example, be of germanium, silicon, or similar suitable infrared-transmitting material. The particular design of the collecting optics is, of course, no part of the present invention, and a catoptric system using a Cassegrain mirror may be used. Such a system is shown in the Astheimer and Wormser patent.

As the detector is scanned across the scene in the form of a raster, the intensity of infrared radiations will vary depending on the particular spot on which the detector is imaged, and so the output of the detector will be a varying A.C. signal which is amplified in the amplifier 9. The output of the amplifier is shown diagrammatically as two wires 16 and, for clarity in representing optical paths on the drawings, they are shown as broken. The other wire ends actuate the glow tube 10 which therefore, glows with an intensity corresponding to the intensity of the infrared radiation striking the detector 1. This part of the operation is similar to that which takes place in the Astheimer and Wormser thermograph and the details of the electronic circuits are, therefore, not shown, as they need not be changed when the present invention is employed. There are, of course, included controls for gain and electronic temperature offset, as is described in the Astheimer and Wormser patent. The net result is that the glow tube 10 emits a visual signal proportional to the infrared signal on the infrared detector 1, the average level being determined by the temperature offset or brightness control, and the propartionality by the gain or contrast control, the operation being in general the same as in the Astheimer and Wormser patent.

Radiation from the glow tube strikes another face 12 on the prism 6, which is separate from the face and the point where the radiation strikes is displaced sideways along the prism 6. From the face 12 the radiations are reflected through a lens 11 to a face 13 on the prism 4, which is similarly separate from the face 5 used for infrared scanning. From this reflecting face the radiation passes through another lens 14 and strikes a photographic recording surface 15.

It will be seen that there is drawn on the photographic surface an exact representation of the scene scanned by infrared, and the intensity of light and, therefore, the photographic record is proportional to infrared intensity on the detector 1, which in turn is determined by the temperature of the particular spot of the object being scanned. The prisms turn in exact synchronism, and their reflecting faces are rigidly maintained in accurate angular relation to each other, so that no distortion of the photographic record takes place. At the same time, the light weight and the fact that rotation and not oscillation is involved permits scanning speeds much higher than are practical with the oscillating mirror of the Astheimer and Wormser thermograph. As a result, with detectors of short time constant the thermograph is no longer limited by the scanning speed as in the case of the heavy oscillating mirror in the Astheimer and Wormser thermograph. In fact, potential scanning speeds possible with the prisms of the present invention are greater than is practically needed even with fast detectors. The possibility of using detectors of short time constant permits a very marked reduction in time for taking a thermogram which is practically a very important advantage. At the same time, the advantage is obtained without adding to the cost of the scanning system, which can actually be developed as cheaply or more cheaply in the form of the present invention than was hitherto the case.

Figure 2:
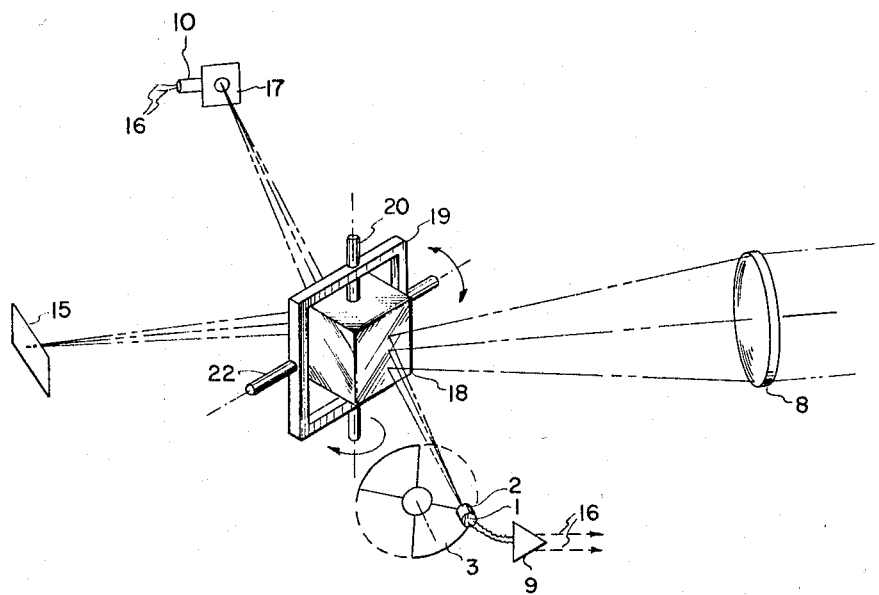
FIG. 2 is a single prism modification for producing thermograms in a single wavelength range.
Figure 3:
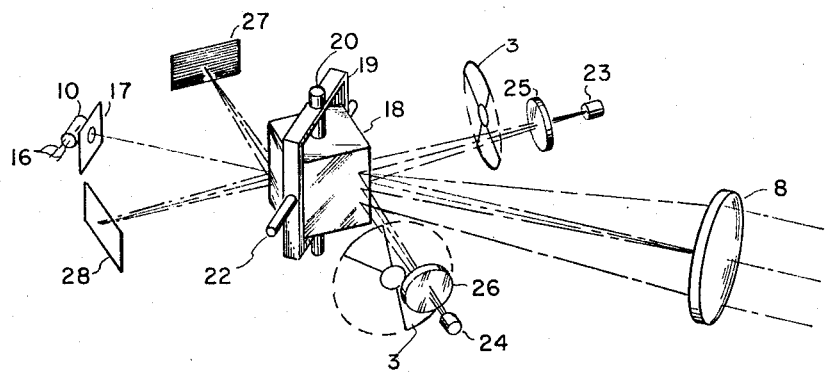
FIG. 3 is a single-prism modification for producing multiple thermograms.

The description of the invention in conjunction with the two-prism modification shown in FIG. 1 clearly brings out the sequence of operating steps. However, the two-prism scanning is more complex, though somewhat more rugged and accurate, and not nearly as compact as the one-prism modification which is illustrated in FIGS. 2 and 3, and which, therefore, for some purposes constitute the preferred modification of the present invention. In these figures the same parts as in FIG. 1 bear the same reference numerals.

FIG. 2 illustrates a single detector modification, as is the case with FIG. 1. Infrared radiation entering through the objective 8 strikes a face of a cube 18 which is rotated continuously about an axis 20 by a synchronous motor (not shown). The axis 20 is mounted in a gimballed frame 19, which frame in turn can be turned about an axis 22 at right angles to the axis 20. This is shown by the short double arrow, and the turning can be effected by ordinary conventional means, for example, a stepping motor with reset. This stepping motor may be of similar design to that used with modern thermographs of the Astheimer and Wormser type. From the face of the cube 18 the infrared radiation is reflected onto a detector 1 in a cavity 2 and the radiation is chopped by a chopper 3. This is the same operation as is described in connection with FIG. 1, and as in the latter figure, the detector output is amplified by the amplifier 9 having output wires 16 shown as broken.

It should be noted that the detector and reference source are illustrated diagrammatically, as the present invention does not deal with this part of the organization, except in so far as the greatly higher scanning speeds which are possible dictate the use of known detectors of sufficiently short time constant and sensitivity for the scanning speed chosen. If the black body source 2 is eliminated, the backs of the chopper blades 3 should be blackened instead of mirror-plated, and will thus constitute a black body reference source at ambient temperature.

The output of the amplifier 9 actuates a glow tube 10, as is described in connection with FIG. 1, which glow tube illuminates a source aperture 17. The beam from this aperture strikes the opposite face of the cube 18, and is reflected out to a film plane 15 in a manner similar to that described in FIG. 1. Since the cube is performing both of the above functions, there is an advantage in having the glow tube aperture produce a beam which is at right angles to the beam reflected to the film plane. The same consideration holds true for the placement of the objective 8 and the detector 1.

As in the case of FIG. 1, the light beam traces lines of light on the photographic film 15, the intensity of the light varying with the signal on the detector 1. The vertical displacement of successive lines on the film plate, however, is effected in a manner different from that of FIG. 1 by tipping or nutating the gimballed framework 19 about the axis 22.

FIG. 2 represents an extremely compact structure, as a number of elements are omitted, notably the second prism 6, and the construction is both compact and economical.

While essentially the same type of thermogram is produced either by FIG. 1 or FIG. 2, it is sometimes desirable to produce two thermograms and to this purpose the one-prism modification lends itself readily. This is illustrated in FIG. 3, the same elements bearing the same reference numerals.

A single objective 8 is used, and a single light source 17 illuminated by the glow tube 10. However, there are two detectors at 45° either side of the optical axis through the objective 8. These detectors are shown diagrammatically as 23 and 24, and one or both detectors may be provided with filters, which are shown at 25 and 26. The arrangement of choppers, reference sources, and amplifiers is the same as in FIG. 2, and therefore these elements are not shown in FIG. 3, in order to make more clear the diagrammatic illustration of the optical paths.

FIG. 3 shows the cube 18 in a position where the infrared radiations strike an edge, that is to say, where they pass from one face to the next one. It will be evident that as the cube turns, first one detector is scanned, and then the other, thus producing in succession signals from the detectors 23 and 24, each corresponding to a horizontal line.

In a similar manner, the light source 17 is reflected first on one photographic surface 27, and then on a second one 28 as the next face of the cube 18 passes by. In other words, there will be produced on the two photographic surfaces thermograms corresponding to the signals from the two detectors 23 and 24. The amplifiers of the two detectors are alternately switched onto the glow tube when the particular detector is receiving radiations. The switching is by conventional circuits, an amplifier being switched in as soon as a signal above a low threshold strikes it from the detector.

The modification shown in FIG. 3 permits producing thermograms from radiation in different parts of the infrared spectrum. This is sometimes of advantage; for example, for medical diagnostic work a thermogram is produced by radiation emitted from the skin of a patient by reason of its temperature, the skin acting as a black body and having a peak of radiation in the vicinity of 10µ. It may be desired, also, to obtain a thermogram at a different wavelength range in the infrared, which shows other features. This is easily effected by choosing the proper filters 25 and 26. Other instance of where it is desired to obtain photographs of a particular scene both by infrared, which is self-emitted, and by reflected radiation, which may be much shorter. It is an advantage of this modification of the present invention that while the two pictures are obtained by the same optical scanning elements, with the exception of the fact that two detecors are needed, the wavelength ranges for the radiations which are used in forming the two pictures can be chosen in whatever band of radiation it is desired to obtain a record. The invention is therefore very flexible, and permits obtaining a number of different effects. Needless to say, the two final photographs are in exact alignment because they are made by the same scanning optics, and so precise comparison of the two photographs becomes possible.

For the same reasons as described in connection with FIG. 2, the two detectors should be placed so that the reflected beams from the prism are at right angles to each other, which makes the beams each 45° with respect to the incoming beam through the objective 8. The same conditions apply to the placement of the film surfaces 27 and 28 with respect to the glow tube aperture 17.

I claim:

1. In a thermograph in which a fixed infrared detector is scanned across an object to be thermographed in the form of a raster, the infrared detector output is transformed into proportional visible light, and the visible light thus produced is scanned across a photographically sensitive surface to produce a picture in raster form corresponding to the temperature of the object to be scanned, the improvement which comprises, in optical alignment,
   (a) a prism-shaped element with an even number of externally reflecting surfaces and means for continuously rotating the element about its axis, the element being oriented so that the infrared detector is scanned across the object to be thermographed in a series of horizontal lines by rotation of the element,
   (b) means for tilting the prism-shaped element about an axis at right angles to the angle of rotation to produce vertical displacement of the horizontal lines,
   (c) the visible light source which varies in proportion to the infrared detector output being positioned and provided with optical means so that its radiations strike an opposite face of the scanning prism-shaped element from that scanning the infrared detector, and are reflected from said face onto the photographic surface.

2. A thermograph according to claim 1 in which the prism-shaped element is a solid prism having external reflecting surfaces.

3. A thermograph according to claim 2 in which the prism is a cube.

4. A thermograph according to claim 3 in which the prism is rotatably mounted in a gimballed framework and means are provided for intermittently moving the framework about an axis at right angles to the axis of rotation of the prism, whereby the prism is nutated and successive horizontal lines are scanned.

5. A thermograph according to claim 3 in which two infrared detectors are positioned at 45 degrees to the axis of incoming infrared radiation and two photographically sensitive surfaces are positioned at 45 degrees to the axis of the visual light radiation, whereby the infrared detectors are successively scanned across the scene, and succesive visual lines are formed on the photographic recording surfaces.

6. A thermograph according to claim 5 in which the infrared detectors are provided with filters passing different wavelength bands.

7. In a thermograph in which a fixed infrared detector is scanned across an object to be thermographed in the form of a raster, the infrared detector output is transformed into proportional visible light and the visible light source thus produced is scanned across a photographically sensitive recording surface to produce a picture in raster form corresponding to the temperature of the object to be scanned, the improvement which comprises, an optical alignment,
   (a) a vertical scanner in the shape of a prism with externally reflecting surfaces and means for continuously rotating the prism about its axis,
   (b) a second prism functioning as a horizontal scanning prism and means for continuously rotating it about an axis at right angles to the first prism and laterally displaced therefrom, the two prisms rotating synchronously but the horizontal scanning prism rotating at a higher rate of speed corresponding to the number of lines scanned,
   (c) the prisms being oriented so that the infrared detector is scanned across the object to be thermographed in a series of horizontal lines by rotation of the horizontal scanning prism, the lines being separated vertically by rotation of the vertical scanning prism,
   (d) a visible light source means, actuated by the infrared detector output to vary the intensity of the visible light source in proportion to the infrared detector output being positioned and provided with optical means so that its radiations strike a portion of a face of the vertical scanning prism other than the portion being used for infrared scanning, and are reflected onto a face of the horizontal scanning prism different from that providing infrared scan, and finally are reflected from said horizontal scanning face onto the photographic surface.

8. A thermograph according to claim 7 in which the vertical scanning prism is elongated axially and has its axis at right angles to but not intersecting the axis of the horizontal scanning prism.

9. A thermograph according to claim 8 in which the prisms have the same even number of faces.

10. A thermograph according to claim 9 in which the prisms are solid.

References Cited by the Examiner
UNITED STATES PATENTS

| | | | |
|---|---|---|---|
| 2,895,049 | 7/1959 | Astheimer et al. | 250—65 |
| 3,183,355 | 5/1965 | Beach | 250—83.3 |

RALPH G. NILSON, *Primary Examiner.*

A. L. BIRCH, *Assistant Examiner.*